United States Patent
Frick

[19]
[11] Patent Number: 6,029,812
[45] Date of Patent: Feb. 29, 2000

[54] REINFORCED HINGE FOR STORAGE MEDIA PACKAGE

[75] Inventor: Markus W. Frick, Syracuse, N.Y.

[73] Assignee: Frick Management Group, Limited, Syracuse, N.Y.

[21] Appl. No.: 09/148,915

[22] Filed: Sep. 4, 1998

[51] Int. Cl.[7] .................................................. B65D 85/57
[52] U.S. Cl. ....................................................... 206/308.1
[58] Field of Search .............................. 206/308.1, 747, 206/748, 449, 755; 220/840, 841, 843, 844

[56] References Cited

U.S. PATENT DOCUMENTS

| | | |
|---|---|---|
| 3,095,965 | 7/1963 | Stahl et al. . |
| 4,702,369 | 10/1987 | Philosophe . |
| 4,793,480 | 12/1988 | Gelardi et al. ........................... 220/840 |
| 5,022,529 | 6/1991 | Kang . |
| 5,310,053 | 5/1994 | Lowry et al. . |
| 5,322,162 | 6/1994 | Melk ...................................... 206/749 |
| 5,379,890 | 1/1995 | Mahler . |
| 5,427,236 | 6/1995 | Kramer . |
| 5,542,531 | 8/1996 | Yeung .................................. 206/308.1 |
| 5,593,031 | 1/1997 | Uchida . |
| 5,657,893 | 8/1997 | Hitchings . |
| 5,682,989 | 11/1997 | Taniyama ............................. 206/308.1 |
| 5,682,991 | 11/1997 | Lammerant et al. ................. 206/308.1 |
| 5,697,498 | 12/1997 | Weisburn et al. ..................... 206/308.1 |
| 5,839,576 | 11/1998 | Kim ..................................... 206/308.1 |
| 5,881,872 | 3/1999 | Frick .................................... 206/308.1 |

FOREIGN PATENT DOCUMENTS

2143210  2/1985  United Kingdom .

*Primary Examiner*—David T. Fidei
*Attorney, Agent, or Firm*—Eugene Stephens & Associates

[57] ABSTRACT

A new reinforced hinge for storage media packages, especially packages for disc-shaped storage media, includes a hinge pin formed as part of a lid of the package. When used in compact disc jewel boxes, the particular arrangement of the hinge allows full compatibility with existing automation machinery for assembly and loading of compact disc jewel boxes, yet is far more robust than prior art hinges. The hinge pin is preferably first inserted into first receptacles in side walls of the base, allowing opening and closing of the package before a storage media carrying tray is inserted into and retained by a base of the package. This allows assembly of the lid and base in one location, then stacking and shipping the partially assembled packages and trays to another location where assembly is completed. To complete assembly, the tray is inserted into the base. Second hinge pin receptacles formed on a second component of the package, preferably the tray, positively engage the hinge pin when the tray inserted is into and retained by the base. When the hinge pin is received by the receptacles and the tray is inserted into the base, the tray is held in place by detents, thus locking the hinge pin in the receptacles and locking the lid on the package. As a result of this arrangement, the package can not accidentally come apart at the hinge. Additionally, a large portion of the hinge can be broken away from the package without loss of hinge operability.

35 Claims, 7 Drawing Sheets

REINFORCED HINGE FOR STORAGE MEDIA PACKAGE

TECHNICAL FIELD

The invention relates to the field of packaging for storage media, especially disc-shaped storage media. The invention particularly relates to hinges of packaging for optical discs, such as compact discs (CDs) and digital video discs (DVDs—also called "digital versatile discs"), commonly referred to as "jewel boxes" or "jewel cases."

BACKGROUND OF THE INVENTION

Prior art storage media packages, such as jewel boxes for audio CDs and CD-ROMs, have suffered a number of disadvantages. (I will refer to CDs in this specification, but the discussion of the prior art and the invention also applies to other disc-shaped records and storage media in general.) The most widely used jewel box comprises a lid pivotably connected to a base, the base holding a tray including a disc carrier. The lid typically has extensions with protrusions that fit into holes on the base to provide the pivot connection. However, the extensions snap off easily, and the protrusions often pop out of the holes into which they are inserted. The resulting connection is not very secure, and the particular construction and type of material from which the jewel boxes are usually made render the connection easily broken.

The tray is typically held in the base by a press or snap-in fit. The tray includes a raised cylindrical portion that spaces the recorded surface of the stored disc from the tray itself. A set of raised, radially arranged fingers formed on the raised cylindrical portion holds the disc in place by an interference fit with the center hole of the disc. To free the disc, the user is supposed to depress the tops of the fingers while lifting the edges of the stored disc.

The ubiquity of this type of jewel box has resulted in a standard set of booklets and informational cards (so-called "C-cards") that are inserted with the storage media, especially for audio CDs. Thus, any redesign of the jewel box that requires something other than the standard booklet or C-card will result in increased publication costs and will consequently have a more difficult time becoming established in the marketplace. More significantly, there is a large amount of investment in automation equipment for assembly and packaging of jewel boxes. Thus, any new jewel box design that would require different automation equipment is unlikely to succeed in the marketplace.

Several attempts at redesigns of this "standard" jewel box have been made. The best attempt is that by Philosophe (U.S. Pat. No. 4,702,369) and includes a tray that slides away from the pivot between the lid and the base, allowing the stored disc to be accessed in two ways: by the conventional opening of the cover and by sliding the tray out of the jewel box. This configuration also allows for stacking of the jewel boxes for more compact storage of a plurality of jewel boxes, yet also allows access to the stored discs without removing a jewel box from the stack. Unfortunately, this configuration suffers from two significant drawbacks.

Firstly, Philosophe still relies on the standard type of hinge connection. As mentioned above, this type of hinge comes apart or breaks quite easily. Consequently, the reliability and durability of the Philosophe jewel box hinge are not what most consumers would desire. Philosophe's jewel box hinge is therefore no improvement over that of the standard jewel box.

Secondly, the C-card that would be used in this newer jewel box would be non-standard or would be easily damaged when the tray was slid out of the jewel box. If a standard C-card were used, it would ride on the tray with its printed surface facing the base. As a result, the printed surface of the C-card could be scratched or torn from the sliding of the tray in and out of the jewel box. If a non-standard C-card were used, it could remain in the base, but might still be torn by the sliding tray. Additionally, as mentioned above, a non-standard C-card would be more costly and would decrease the marketability of the jewel box.

SUMMARY OF THE INVENTION

My new reinforced hinge for storage media packages, particularly packages for disc-shaped storage media such as compact discs, overcomes the drawbacks of the prior art packages by providing a better hinge arrangement that is completely compatible with current automation equipment, and uses standard C-cards. The improved hinge has greater structural integrity than prior art packages, reducing or eliminating the risk of the package falling apart accidentally. It is extremely unlikely that the hinge will spontaneously disassemble itself during normal use of the jewel box, and the risk of breakage is greatly reduced. Additionally, my robust hinge design provides for proper operation of the hinge even when a significant portion of the hinge has been removed by breakage. The full compatibility with existing automation equipment and the use of standard C-cards results in the elimination of barriers to marketability that incompatible prior art packages and packages using non-standard C-cards suffered.

My hinge arrangement provides full angular separation of the lid from the rest of the package for easy access to the disc while providing a stronger, more reliable pivot connection between the lid and the rest of the package. I eliminate the standard extensions and their protrusions, and I achieve a more positive engagement between the hinge components. The hinge uses a hinge pin that is locked in place upon assembly of the package, essentially eliminating the chance of the lid falling off the package when it is opened. Thus, my hinge arrangement increases the potential usable life of the package. Further, because of the hinge pin and hinge pin receptacle design and arrangement, the hinge will function with as much as two-thirds of the hinge broken off. An additional feature of my hinge arrangement is that it can include integral recesses used in stacking a plurality of packages.

I prefer to form my package from resinous materials, such as plastics, for economy and ease of manufacture. Additionally, I prefer to use plastics recycled from consumer waste, such as beverage containers, to reduce pollution of the environment. However, I recognize that the use of such materials results in an increase in manufacturing cost and therefore provide for the use of other materials for those of a less philanthropic mind set.

DESCRIPTION OF THE INVENTION

An example of an embodiment of my inventive package 1 is shown in the accompanying Figures and is shown assembled in FIGS. 1–5 and 20. I will refer to the top 2, sides 5, recesses 3, bottom 4, front 6, and back or rear 7 of the package 1. As can best be seen in the FIGS. 1–4 and 20, my new hinge 200 is preferably formed in a package including three major components: a base 100, a tray 300, and a lid 400. The base 100 holds the tray 300 and both the base 100 and the tray 300 hold the lid 400 in the preferred embodiment of my hinge 200 as is described below.

Figure 17:
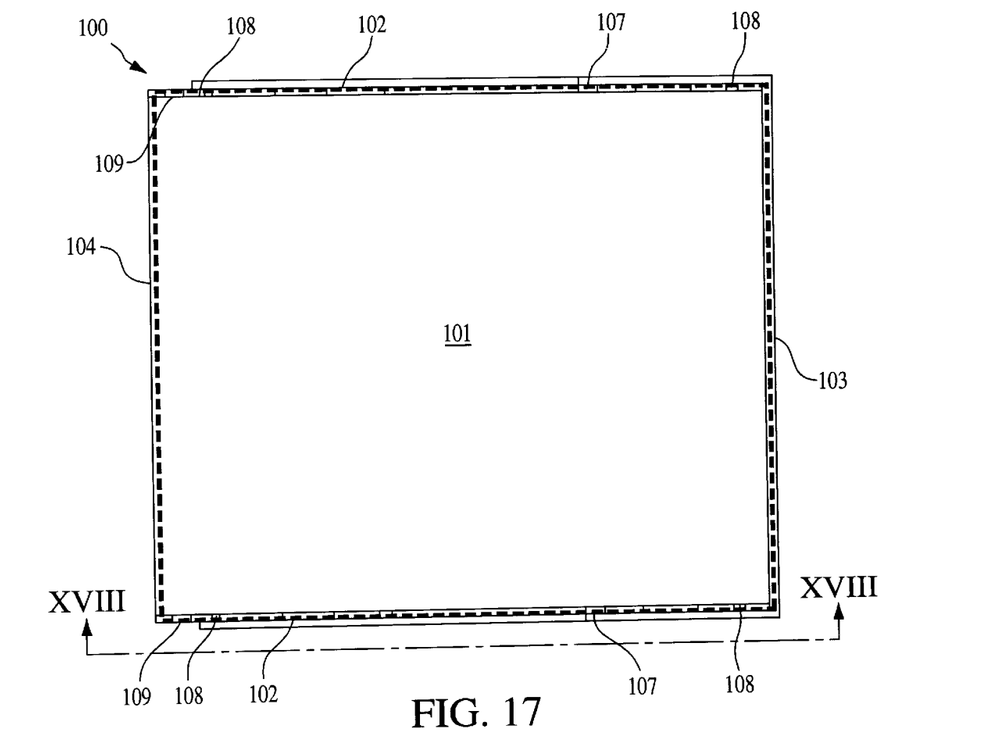
FIG. 17 is a view of the base of my invention as shown in FIG. 1.
Figure 18:
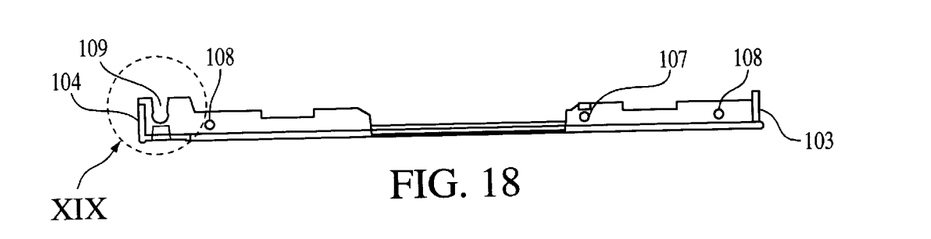
FIG. 18 is a view of the lid of FIG. 17 taken from the line XVIII—XVIII.
Figure 19:
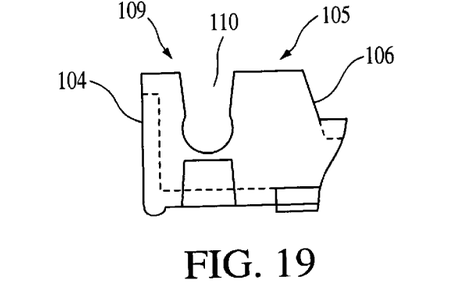
FIG. 19 is an enlargement of the portion of FIG. 18 indicated within the dashed-line circle labeled XIX.
Figure 20:
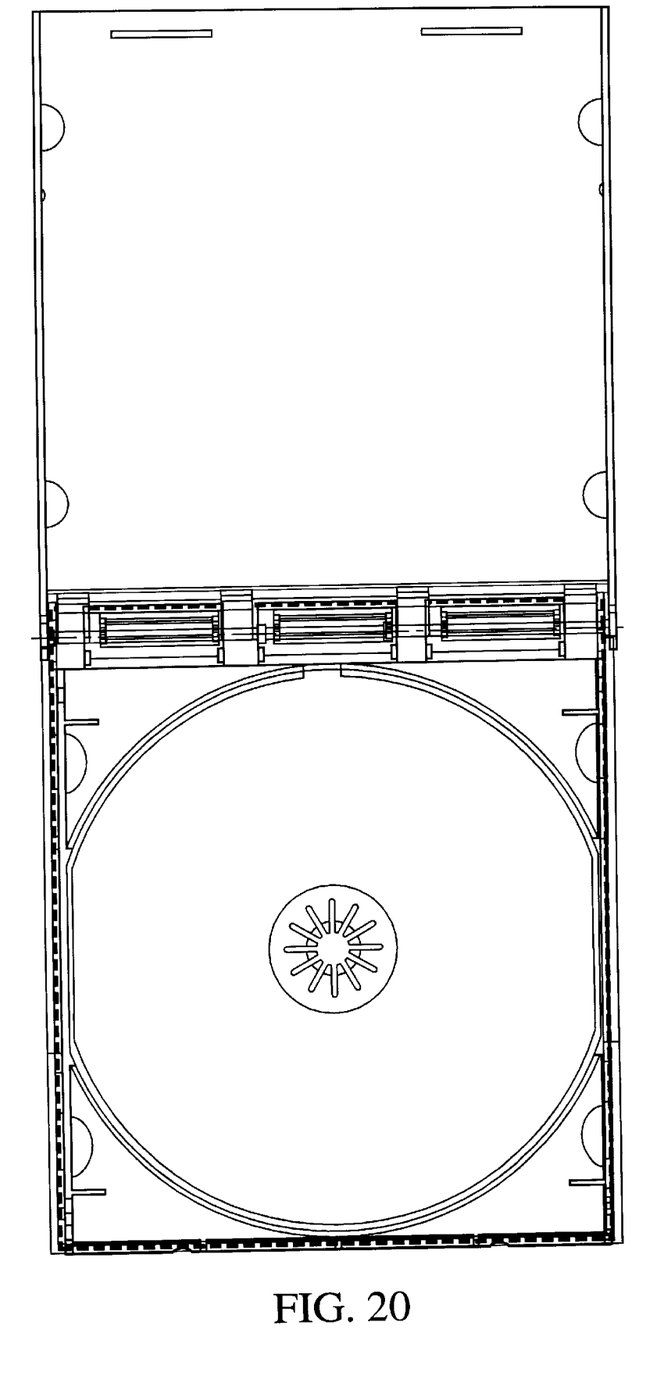
FIG. 20 is a see-through top view of the embodiment of my invention shown in FIG. 1 with the lid opened 180° from its closed position so that its outer surface is coplanar with the outer surface of the base.

I will describe my invention in the context of packages for disc-shaped storage media ("discs"), such as CDs and DVDs; but my invention can be used with packages for other types of storage media as well. With particular reference to FIGS. 17–19, I form the base 100 of my inventive package 1 with a bottom wall 101 that forms the bottom 4 of the package, two side walls 102 that are preferably slightly inward of edges of the bottom wall 101, a front wall 103, and a back wall 104. The side walls 102 each include a raised portion 105 near the back wall 104 that engages the tray 300 near the hinge 200. I prefer to form the raised portions 105 of the side walls 102 at substantially the same elevation as the back wall 104. I also prefer to form inclined portions 106 of the side walls 102 leading to the raised portions 105. As can be seen in the Figures, the side walls 102 include latching recesses 107 that receive latching projections 412 of the lid as will be described. The side walls 102 also include tray locking recesses 108 arranged to receive locking projections 306 as will be described. The front wall 103 is preferably formed with a height substantially the same as that of the back wall 104 and the raised portions 105 of the side walls 102. The bottom wall 101 can include projections extending from its lower surface near the back wall 104 that can be inserted into mating recesses 3 in the top 2 of another package 1 of the same type to allow secure stacking of the packages 1. When the base 100 of my invention is compared to the base of the "standard" CD package, it can be seen that the two are similar in configuration. However, my base 100 differs in that the first hinge pin receptacles 109 in the side walls 102 include channels through which end portions of the hinge pin 409 can be inserted. The channels 110 are shaped so that the ends of the hinge pin 409 are retained in the first hinge pin receptacles 109 after the ends have been inserted. FIGS. 17–19 show that the channels 110 are preferably through holes in the side walls 102 of the base 100 that are open upwardly. FIGS. 18 and 19 show that the channel 110 is preferably shaped with a narrow point just above its highest point of engagement with the hinge pin 409 when the hinge pin 409 is fully inserted into the first hinge pin receptacles 109 via channels 110. The narrow point is an entry gap that is narrower than the diameter of the hinge pin 409, inducing retention of the hinge pin 409 by the first hinge pin receptacle 109 once the hinge pin 409 has been fully inserted therein. This allows the package 1 to be opened and closed with only the lid and base assembled, which is necessary for current standard CD packaging processes. Typically, a package manufacturer will assemble lids and bases, close them, stack the partially assembled packages, and ship them to a CD producer along with stacks of trays. The CD producer then unpacks the partially assembled packages, opens them flat so that the outer surface of the lid is coplanar with the outer surface of the base, inserts C-cards in the bases, and inserts the trays into the bases. Once the trays are locked into the bases, CDs are placed in the trays, informational booklets are placed in the lids, and the now fully assembled packages are closed, wrapped, and shipped. My particular arrangement of the first hinge pin receptacles 109 in the base 100 of the package ensures that these same, standard steps, which are largely done with expensive automated equipment, can still be done with my invention without any alterations.

Figure 1:
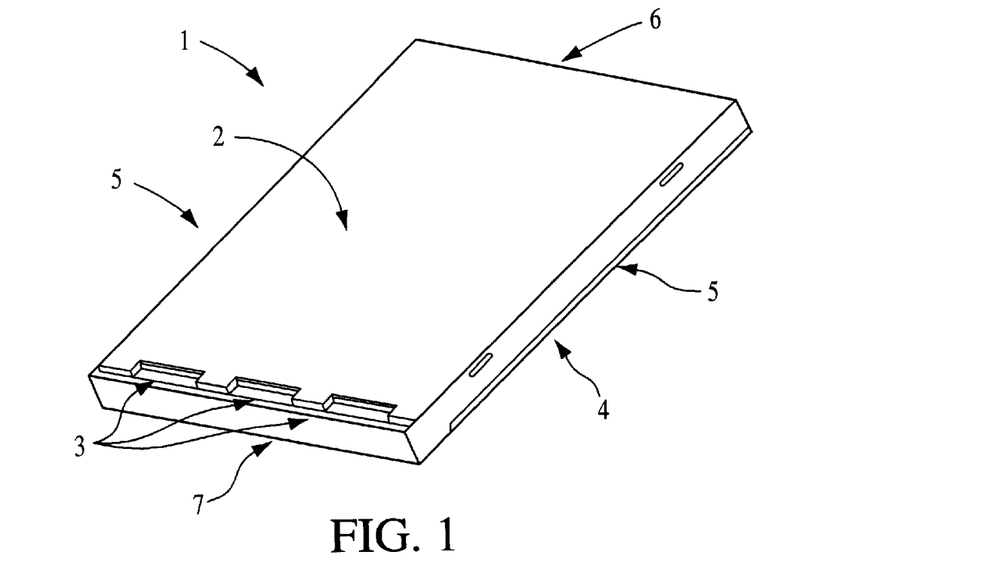
FIG. 1 is a top elevational view of an embodiment of my invention when it is closed.
Figure 2:
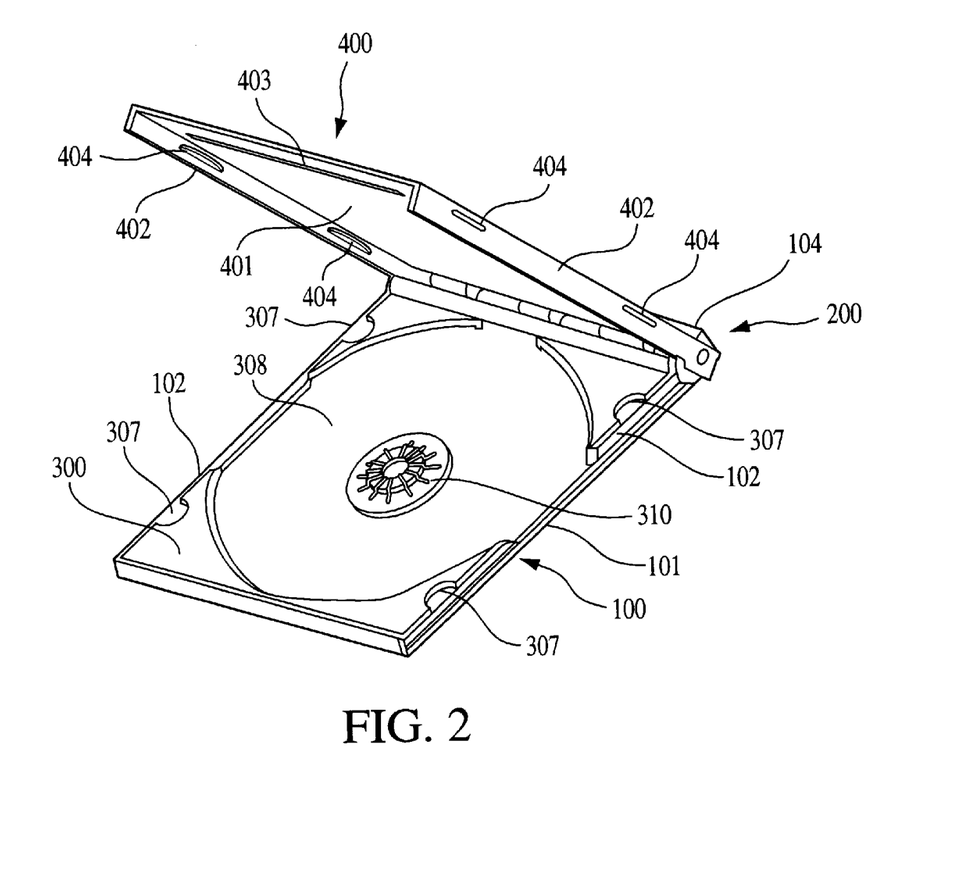
FIG. 2 is a top elevational view of the embodiment of my invention shown in FIG. 1 with the lid partially opened.
Figure 3:
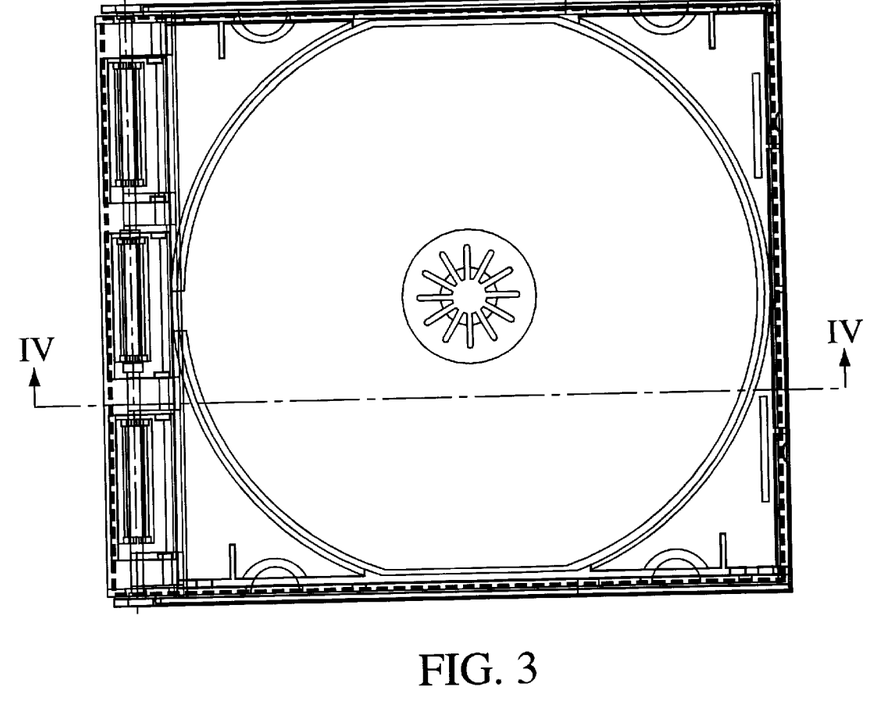
FIG. 3 is a see-through top view of the embodiment of my invention shown in FIG. 1.
Figure 4:
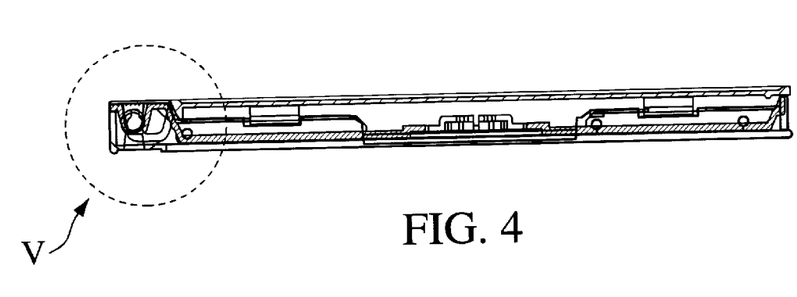
FIG. 4 is cross section of the embodiment of my invention shown in FIG. 1 and taken along the line IV—IV.
Figure 5:
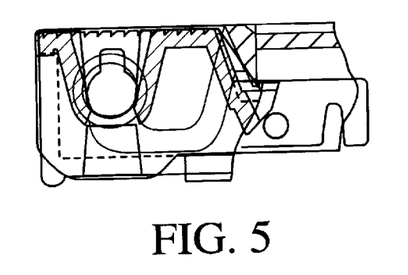
FIG. 5 is an enlargement of the portion of FIG. 4 indicated within the dashed-line circle labeled V.
Figure 6:
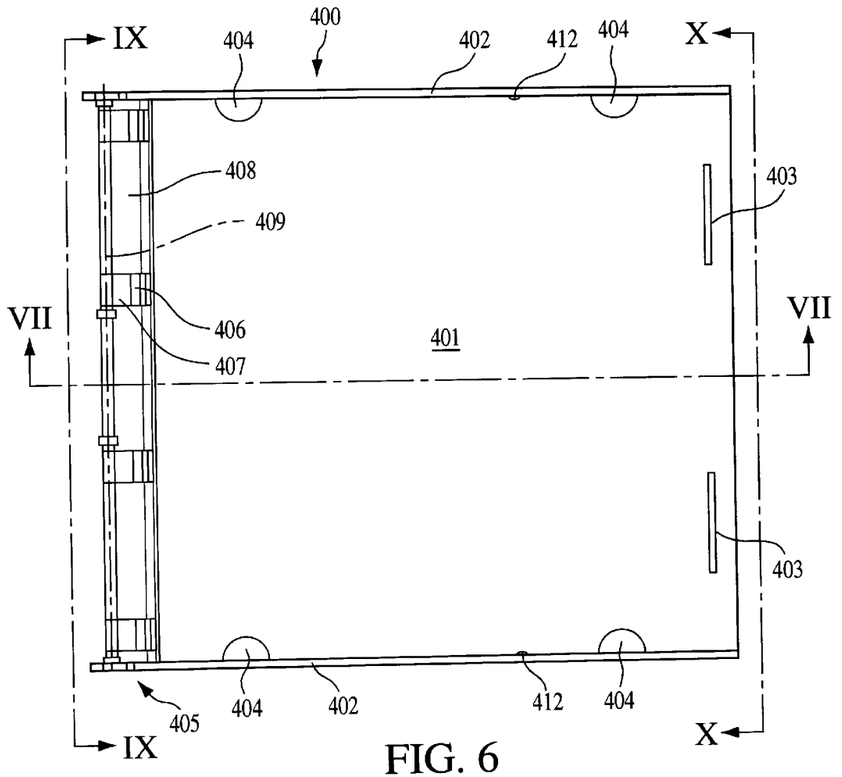
FIG. 6 is a view of the lid of my invention as shown in FIG. 1.
Figure 7:
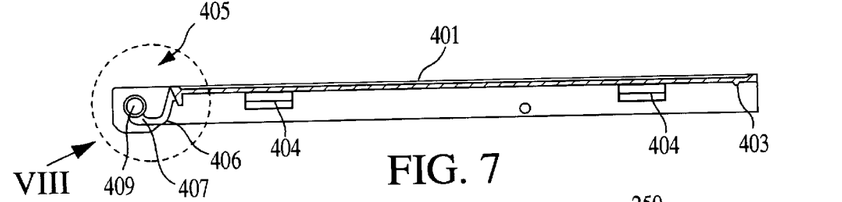
FIG. 7 is a cross section of the lid of FIG. 6 taken along the line VII—VII.
Figure 8:
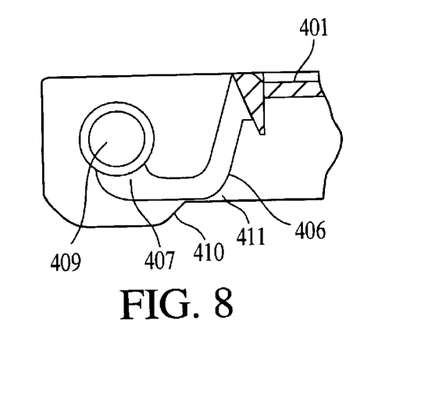
FIG. 8 is an enlargement of the portion of FIG. 7 indicated within the dashed-line circle labeled VIII.
Figures 9, 10:
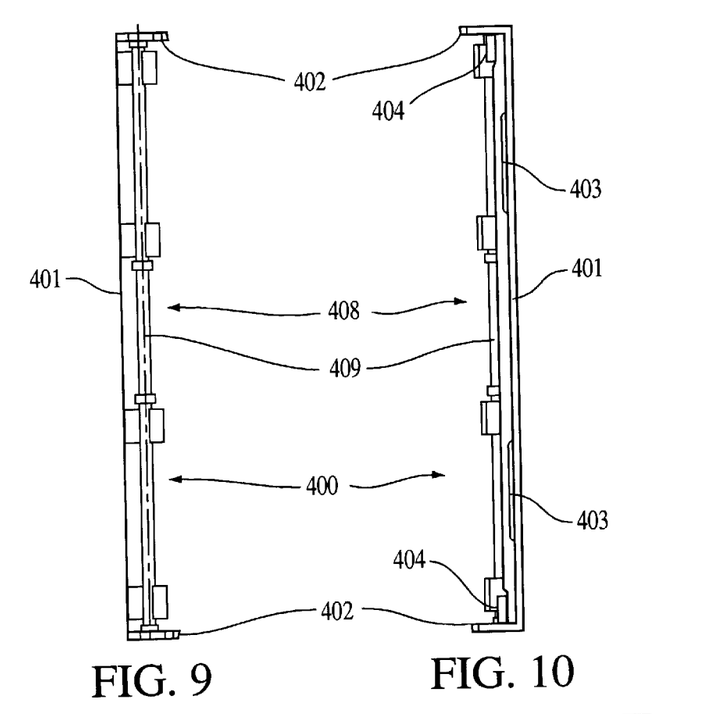
FIG. 9 is a side view of the lid of FIG. 6 taken from the line IX—IX.
FIG. 10 is a side view of the lid of FIG. 6 taken from the line X—X.
Figure 11:
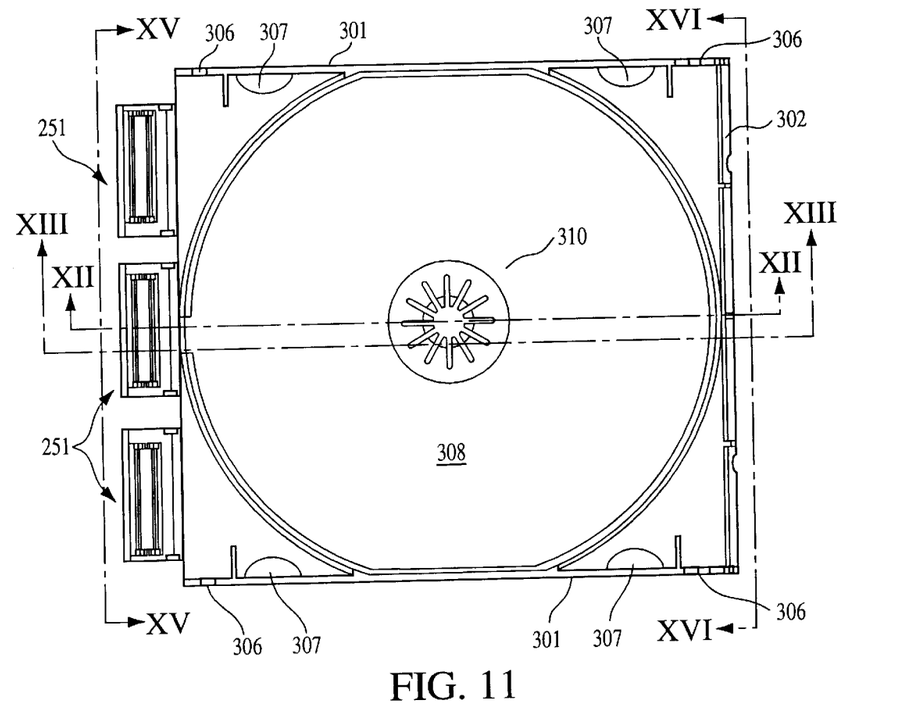
FIG. 11 is a view of the tray of my invention as shown in FIG. 1.
Figure 12:
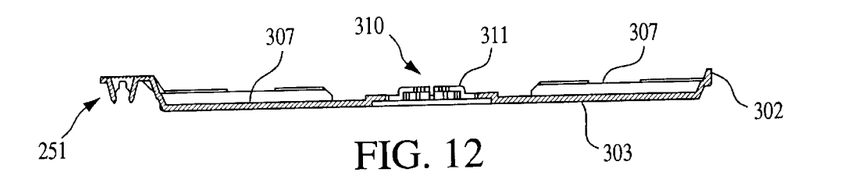
FIG. 12 is a cross section of the tray of FIG. 11 taken along line XII—XII.
Figure 13:
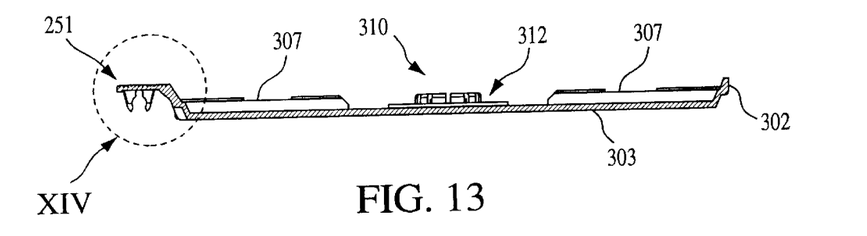
FIG. 13 is a cross section of the tray of FIG. 11 taken along line XIII—XIII.
Figure 14:
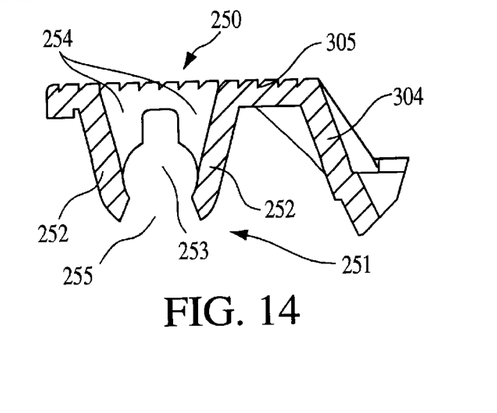
FIG. 14 is an enlargement of the portion of FIG. 13 indicated within the dashed-line circle labeled XIV—XIV.
Figure 15:
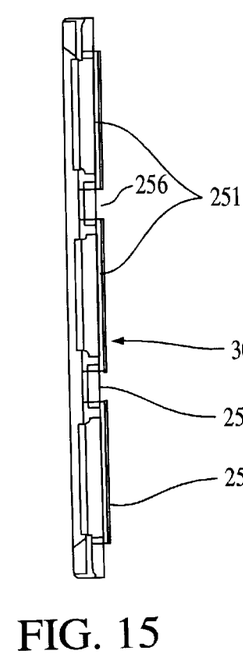
FIG. 15 is a side view of the tray of FIG. 11 taken from the line XV—XV.
Figure 16:
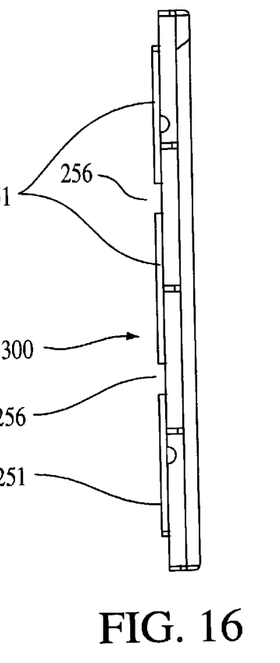
FIG. 16 is a side view of the tray of FIG. 11 taken from the line XVI—XVI.

The base 100 holds the tray 300 via an interference or press fit as is known in the art. I prefer to use the tray locking projections 306 and recesses 108 as seen on standard CD jewel boxes. The overall configuration of the two parts is similar to that of the "standard" CD jewel box base and tray. As particularly shown in FIGS. 11–16, my tray 300 includes side walls 301, a front wall 302, a bottom wall 303, a ramp or inclined surface 304 to a rear shelf or raised portion 305, locking projections 306, recesses 307 for booklet holding tabs 404 (as seen in FIG. 2, for example), and a recess 308 for the CD or other storage media much as the standard CD jewel box does. My tray 300 also includes a centrally located disc holding device or mechanism 310 particularly suited for use with disc-shaped pieces of storage media (discs), which can simply be the "standard" device. A series of radially arranged fingers or tabs 311 form a raised cylinder 312 that can be inserted into a center hole of a disc, such as a compact disc, with an interference fit as is known in the art.

However, the rear shelf 305 of the preferred arrangement of my tray is part of a hinge area 250 of the tray 300 that carries essential parts of my preferred inventive hinge 200. Preferably, at least one second hinge pin receptacle 251 projects from the underside of the shelf 305 and is arranged to positively engage the hinge pin 409 when the tray 300 is inserted into the base 100 (after, of course, the lid 400 and base 100 have been assembled). The second hinge pin receptacles 251 preferably include facing pairs of receptacle bodies 252 of substantially identical cross section and shaped to form a substantially cylindrical cavity 253 between the bodies 252. To allow entry of the hinge pin 409 into the cavity 253, I form an entry gap 255 that is smaller than the diameter of the hinge pin 409 so that the receptacle bodies 252 expand during insertion of the hinge pin 409, then return to approximately their original position to retain the hinge pin 409 in the substantially cylindrical cavity 253 once insertion is complete. I prefer to divide the shelf 305 into three portions, each of which carries its own second hinge pin receptacle 251, with gaps 256 between the shelf portions to accommodate hinge pin support projections 406 of the lid 400. For additional strength, I prefer to form reinforcing ribs 254 on the receptacle bodies 252. The receptacle bodies 252 can also be configured so that they cannot expand after insertion of the hinge pin 409 using some sort of interference.

While placing the second hinge pin receptacles 251 on the shelf 305 of the tray 300 yields the best and most secure hinge 200, it is possible to form the second hinge pin receptacles 251 on the base 100. In this case, the shelf 305 of the tray 300 would still include gaps to accommodate hinge pin support projections 406 of the lid 400. The shelf 305 would act to prevent removal of the hinge pin 409 from the first and second hinge pin receptacles 109, 251 since the shelf 305 is held in place by the interaction of the tray locking projections 306 and recesses 108. Forming my hinge 200 in this manner could also do away with the first hinge pin receptacles 109 in the base 100. However, while the structural integrity of this arrangement (forming the second hinge pin receptacles 251 on the base 100) is superior to the standard CD jewel box hinge, it is inferior to my preferred arrangement.

The lid 400 of my package 1 includes a top wall 401 and two side walls 402 as seen in FIGS. 1–10 and 20. The front edge of the top wall 401 rests atop the front wall 104 of the base 100 when the package 1 is closed, with the lid side walls 402 resting on the side walls 102 of the base 100 and the side walls 301 of the tray 300. I prefer to form the side walls 402 with recessed portions 411 and inclined surfaces 410 corresponding to the preferred raised portions 105 and inclined surfaces 106 of the base side walls 102. I include tabs 404 extending from the lid side walls 402, as well as front and back projections 403 on the top wall lower surface, to hold the "standard" informational booklet that is typically packaged with discs such as CDs and DVDs. Latching projections 412 extend from the inner surfaces of the side walls 402 in their front third and interact with latching recesses 107 in the side walls 102 of the base 100 to give resistance to opening of the package 1 once it has been closed.

The back region 405 of the lid 400 includes parts of my inventive hinge mechanism. I form the hinge pin 409 extending from the top wall lower surface and supported by hinge pin supports 407 also extending from the top wall lower surface on projections 406 of the top wall 401. Because the lid 400 is based on the standard jewel box lid, gaps 408 are left between the hinge pin support projections 406. These gaps 408 form recesses 3 in the top surface 2 of the package that can receive optional projections of the base 100 of a package 1 of the same type so that a user can stack the packages 1 more securely. As a result of the formation of the hinge pin 409 as part of the lid 400, the lid 400 is attached to the tray 300 as well as to the base 100. This arrangement serves to lock the hinge pin 409 into place and lid 400 firmly in place. The resulting package 1 has greater structural integrity than prior art packages, and the resulting hinge 200 has far greater structural integrity. Unlike the prior art hinges, intentional disassembly is extremely unlikely with my hinge 200 since the hinge pin 409 is held by at least one second hinge pin receptacle 251 over and above the more common first hinge pin receptacles 109 of the base 100, because the second hinge pin receptacles 251 act to retain the hinge pin 409, and because the interference fit holding the tray 300 in the base 100 holds the second hinge pin receptacles 251 in place. In the event of breakage of a portion of the hinge 200 away from the package 1, the rest of the hinge pin 409 is still held by the second hinge pin receptacle(s) 251 and possibly one or both of the first hinge pin receptacles 109. This allows normal operation of the hinge 200 even when it has been broken. The standard jewel box hinge frequently spontaneously disassembles, and if one of the standard prior art hinge pin receptacles breaks off, the prior art hinge is inoperative.

As described above, I assemble my package 1 by putting the lid 400 and the base 100 together via insertion of the ends of the hinge pin 409 into the first hinge pin receptacles 109. If the package is to be shipped elsewhere for completion of assembly, I close the package and send it to that location with stacks of trays ready for completion of assembly. For completion of assembly, I open the package 1 so that the outer surface of the lid 400 is coplanar with the outer surface of the base 100 (180° from closed position) and insert the tray 300 into the base 100. The insertion of the tray 300 will typically be preceded by insertion of a C-card into the base. An informational booklet can also be placed in the lid 400 between the booklet tabs 404 and projections 403 at any point in the completion of assembly. The package 1 is then closed and is ready for wrapping and shipping. Of course, it could be shipped open if the user so desires.

All of the parts of my inventive package are preferably formed from resinous materials, such as plastics, by injection molding. In particular, I prefer to make most of the parts from recycled polyethylene terephthalate (PET) derived from beverage bottles and from recycled polyvinyl chloride (PVC). To ensure a minimum of friction, parts that slide against each other should be made from different materials. For example, if the tray 300 were made from PET, then the support plate 200 should be made from PVC. Using recycled plastics wherever possible, while more expensive, will reduce the amount of plastics deposited in landfills, thereby increasing the useful life of existing landfills and reducing the overall amount of refuse entering our environment.

Parts List

1 Package
2 Top of package
3 Recesses of package top
4 Bottom of package
5 Sides of package
6 Front of package
7 Back or rear of package
100 Base
101 Bottom wall of base
102 Side wall of base
103 Front wall of base
104 Back wall of base
105 Raised portions of side walls of base
106 Inclined portions of side walls
107 Latching recesses
108 Tray locking recesses
109 Receptacles for ends of hinge pins
110 Hinge pin entry channels 200 Hinge
250 Hinge area of tray
251 Hinge pin receptacles
252 Receptacle bodies
253 Substantially cylindrical cavity for hinge pin
254 Reinforcing ribs
255 Entry gap for hinge pin
256 Gaps for hinge pin support projections
300 Tray
301 Side wall of tray
302 Front wall of tray
303 Bottom wall of tray
304 Ramp to rear shelf of tray
305 Rear shelf of tray
306 Locking projections
307 Recesses for booklet tabs
308 Recess for storage media
310 Disc holding device/mechanism
311 Tabs or fingers
312 Raised cylindrical arrangement of fingers; raised cylinder formed by fingers
400 Lid
401 Top wall of lid
402 Side walls of lid
403 Top wall projection for information booklet
404 Booklet tab extending from lid side wall
405 Back portion or region of lid; hinge portion
406 Lid hinge support projection
407 Hinge pin support
408 Recesses or gaps between hinge pin support projections
409 Hinge pin
410 Inclined surfaces of lid side walls
411 Recessed portions of lid side walls
412 Latching projections

I claim:

1. A hinge pivotably connecting a first component of a package for storage media to a second component of a package for storage media, the first component including a lid, the second component including a tray and a base retaining the tray, the hinge comprising:
a hinge pin formed on the lid to provide a pivot connection between the lid and the second component of the package when the package is assembled;
a hinge pin receptacle formed on the second component configured to receive the hinge pin and acting to block removal of the hinge pin from the second component once the hinge pin has been received by the hinge pin receptacle; and
facing receptacle bodies of the hinge pin receptacle arranged with at least one of the receptacle bodies extending along one side of the hinge pin and at least one other of the receptacle bodies extending along an opposite side of the hinge pin, the at least one and at least one other receptacle bodies thereby facing each other across the hinge pin, the receptacle bodies being of substantially identical cross section configured to retain the hinge pin therebetween.

2. The hinge of claim 1 further comprising a hinge pin support projection formed on the lid to support the hinge pin.

3. The hinge of claim 1 wherein the hinge pin extends parallel to and along a substantial portion of the length of a hinge side of the lid.

4. The hinge of claim 1 wherein there are a plurality of hinge pin receptacles formed in a spaced-apart arrangement on the second component.

5. The hinge pin of claim 4 wherein the hinge pin is supported on a plurality of hinge pin support projections formed on the lid and spaced apart to form projection gaps to accommodate the plurality of hinge pin receptacles.

6. The hinge of claim 5 wherein the projection gaps form recesses in a top of the package for receiving projections on a bottom of another package of the same type, thereby allowing secure stacking of a plurality of the packages.

7. The hinge of claim 5 further including second hinge pin receptacles formed in side walls of the base and arranged to rotatably receive and retain ends of the hinge pins, thereby allowing the package to be opened and closed with only the lid and the base assembled.

8. In a package for storage media, a hinge pivotably connecting a lid to a tray held in a base of the package, the hinge including:
a hinge pin formed as part of a projection of the lid, the projection being integral with the lid and with the hinge pin and extending along a hinge side of the lid, the hinge pin being substantially cylindrical and extending parallel to the hinge side of the lid, the hinge pin further acting as a pivot point for pivotably connecting the lid to the base; and
a hinge pin receptacle formed as part of one of the tray and the base so that the hinge pin receptacle engages and retains the hinge pin with opposed receptacle bodies that face each other across a longitudinal axis of the hinge pin, the hinge pin receptacle including a substantially cylindrical cavity in which the hinge pin sits and can rotate.

9. In a package for storage media, a hinge pivotably connecting a lid to a tray held in a base of the package, the hinge including:
a hinge pin formed as part of a projection of the lid, the projection being integral with the lid and with the hinge pin and extending along a hinge side of the lid, the hinge pin being substantially cylindrical and extending parallel to the hinge side of the lid, the hinge pin further acting as a pivot point for pivotably connecting the lid to the base;
a hinge pin receptacle formed as part of the tray so that the hinge pin receptacle engages and retains the hinge pin, the hinge pin receptacle including a substantially cylindrical cavity in which the hinge pin sits and can rotate; and
the hinge pin receptacle further including an entry gap for the hinge pin that is narrower than a diameter of the substantially cylindrical cavity so that the hinge pin receptacle retains the hinge pin via an interference fit.

10. In a package for storage media, a hinge pivotably connecting a lid to a tray held in a base of the package, the hinge including:
a hinge pin formed as part of a projection of the lid, the projection being integral with the lid and with the hinge pin and extending along a hinge side of the lid, the hinge pin being substantially cylindrical and extending parallel to the hinge side of the lid, the hinge pin further acting as a pivot point for pivotably connecting the lid to the base;
a first hinge pin receptacle formed as part of the base;
a second hinge pin receptacle formed as part of the tray;
the first hinge pin receptacle serving primarily to allow opening and closing of the package in a partially assembled state of the package and also assisting in retaining and supporting the hinge pin in a fully assembled state of the package; and
the first and second hinge pin receptacles each engage and retain the hinge pin and each include a substantially cylindrical cavity in which the hinge pin sits and can rotate.

11. The package of claim 10 wherein the second hinge pin receptacle includes an entry gap for the hingepin that is narrower than a diameter of the substantially cylindrical cavity so that the hinge pin receptacle retains the hinge pin via an interference fit.

12. The package of claim 11 wherein the second hinge pin receptacle includes a pair of opposed receptacle bodies of substantially identical cross section, the entry gap and the substantially cylindrical cavity of the second hinge pin receptacle being formed by and located between the opposed receptacle bodies.

13. The package of claim 11 wherein the second hinge pin receptacle extends toward the base from an underside of a shelf of the tray that overlies the hinge pin.

14. A method of assembling the package of claim 12 including the steps of:

providing a lid with a pair of first hinge pin receptacles;

inserting ends of the hinge pin into respective first hinge pin receptacles so that the first hinge pin receptacles retain the hinge pin, yet allow the package to be opened and closed in its partially assembled state; and inserting the tray into the base so that the second hinge pin receptacle engages and locks onto the hinge pin, the tray further including detents that hold the tray in the base.

15. A reinforced hinge in a three-part package including:

an integral hinge pin formed on a hinge side of a lid, the lid being a first part of the three-part package;

first hinge pin receptacles formed in respective side walls of a base, the base being a second part of the three-part package, the side walls being perpendicular to the hinge side of the lid, the first hinge pin receptacles engaging and pivotably retaining ends of the hinge pin so that the lid can be pivoted relative to the base in a partially assembled state of the package in which the tray is not yet inserted in the base; and second hinge pin receptacles extending toward the base from an underside of a shelf of a tray, the tray being a third part of the three-part package, and the shelf overlying the hinge pin in a fully assembled state of the package in which the tray is inserted into and held in the base; and wherein the second hinge pin receptacle reinforces the hinge so that disassembly and breakage of the hinge in the course of ordinary use are substantially prevented; and further wherein the hinge is operable even when a significant portion of the hinge is broken off of the package.

16. The hinge of claim 15 wherein a hinge pin support is formed integrally with and between the hinge pin and the hinge side of the lid.

17. The hinge of claim 16 wherein the hinge pin support has a gap sized to accommodate the second hinge pin receptacle.

18. The hinge of claim 16 wherein there are at least two second hinge pin receptacles and the hinge pin support has respective gaps sized to accommodate the second hinge pin receptacles, the at least two hinge pin receptacles being spaced apart to accommodate the hinge pin support.

19. A hinge for a package made by the process of:

forming as one piece a hinge pin and a lid of the package, the hinge pin extending parallel to and along a length of a hinge side of the lid;

forming first hinge pin receptacles in a base of the package, the first hinge pin receptacles being configured to receive and rotatably retain ends of the hinge pin, the rotatable retention of the hinge pin thereby enabling pivoting of the lid relative to the base about the hinge pin even with only the lid and base assembled;

forming a second hinge pin receptacle as part of a tray of the package, the second hinge pin receptacle including opposed receptacle bodies that face each other across a longitudinal axis of the hinge pin, the second hinge pin receptacle being configured to positively engage the hinge pin when the tray is inserted into and retained in the base by detents in the form of tray locking projections on one of the tray and the base that interact with tray locking recesses in the other of the tray and the base, the second receptacle further being sized to engage spaced apart portions of the hinge pin to prevent accidental removal of the hinge pin from the first and second receptacles in cooperation with the retention of the tray in the base;

inserting the ends of the hinge pin into the first receptacles; and inserting the tray into the base so that the second receptacle positively engages the hinge pin.

20. The hinge of claim 19 wherein the process of making the hinge further includes, between the steps of inserting the ends of the hinge pin into the first receptacles and inserting the tray into the base, the steps of:

opening the package so that an outer surface of the lid is coplanar with an outer surface of the base; and inserting a C-card into the base.

21. In a media storage box comprising a lid, a base, and a media holding tray retained in the base via tray locking projections in one of the base and the tray and tray locking recesses in the other of the tray and the base, a hinge including:

a. a hinge pin integrally formed on the lid of the box and an upwardly open first hinge pin receptacle integrally formed on the base of the box so that the hinge pin can be snapped downwardly into the first hinge pin receptacle for hingedly connecting the lid and the box base; and b. a hinge pin engaging portion of the media holding tray that prevents upward removal of the hinge pin from the box base by virtue of engagement of the hinge pin by the hinge pin engaging portion and by virtue of the retention of the media holding tray in the base by the tray locking projections and recesses, the hinge pin engaging portion being a second hinge pin receptacle formed on the tray.

22. The hinge of claim 21 wherein the hinge connection between the lid and the box base allows the lid and the box base to lie open in a common plane.

23. The hinge of claim 21 wherein the hinge pin engaging portion of the tray strengthens the box hinge connection between the lid and the box base.

24. The hinge of claim 21 wherein the tray has an interference retention in the box base so that the tray is secured within the base after insertion therein, thereby ensuring that the hinge pin engaging portion of the tray will remain substantially stationary in its engagement of the hinge pin.

25. A method of making and assembling the hinge of claim 21 including the steps of:

forming the lid with the integral hinge pin, the base with the upwardly open first hinge pin receptacle, and the tray with the hinge pin engaging portion;

snapping the hinge pin into the first hinge pin receptacle;

pivoting the lid about the hinge pin so that a top surface of the lid is coplanar with a bottom surface of the base; and snapping the tray into the base.

26. The method of claim 25 further including the step of, after snapping the hinge pin into the first hinge pin receptacle and before pivoting the lid, closing the box and shipping the box and the tray to another location where assembly will be completed.

27. The method of claim 26 further including the steps of:

after pivoting the lid and before snapping the tray into the base, placing a C-card into the base; and after snapping the tray into the base, placing an information booklet in the lid and closing the package.

28. The hinge of claim 21 wherein the second hinge pin receptacle includes at least one pair of facing receptacle bodies of substantially identical cross section configured to positively engage and retain the hinge pin therebetween.

29. A media storage box hinge comprising:

a. a lid hinge pin that snap fits in a downward direction into a first hinge pin receptacle in a box base; and b. a second hinge pin receptacle that snaps downward over the hinge pin to positively engage the hinge pin and to prevent upward removal of the hinge pin from the box base, the second hinge pin receptacle being a hinge pin engaging portion of a tray that snaps into and is retained by the box base.

30. The media storage box hinge of claim 29 wherein the second hinge pin receptacle extends from the tray toward the base.

31. The media storage box hinge of claim 29 wherein one of the first and second hinge pin receptacles includes at least one pair of facing receptacle bodies configured to positively engage and retain the hinge pin.

32. The media storage box hinge of claim 31 wherein the receptacle bodies are of substantially identical cross section.

33. The media storage box hinge of claim 29 wherein the lid hinge pin is supported by at least one hinge pin support projection formed on the lid.

34. The media storage box hinge of claim 33 wherein a plurality of hinge pin support projections support the lid hinge pin and gaps between the hinge pin support projections form recesses in a top of the package when the package is closed, the gaps being arranged to receive projections formed on a bottom of a similar media storage box.

35. The media storage box hinge of claim 33 wherein each hinge pin support projection is substantially U-shaped, an end of one leg of the hinge pin support projection being joined to the lid and another leg of the hinge pin support projection being joined to the lid hinge pin.

* * * * *